United States Patent
Mandelkau et al.

(10) Patent No.: US 11,790,763 B2
(45) Date of Patent: Oct. 17, 2023

(54) CONFIGURATION SYSTEM AND COMPUTER PROGRAM PRODUCT FOR CONFIGURATION OF A CONTROL CENTER

(71) Applicant: Minimax Viking Research & Development GmbH, Bad Oldesloe (DE)

(72) Inventors: Detlef Mandelkau, Bad Schwartau (DE); Henning Lippke, Lübeck (DE); Keno Selzer, Trappenkamp (DE); Bernd Hallwass-Fedder, Hamburg (DE)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 0 days.

(21) Appl. No.: 17/608,121

(22) PCT Filed: May 6, 2020

(86) PCT No.: PCT/EP2020/062596
§ 371 (c)(1),
(2) Date: Nov. 1, 2021

(87) PCT Pub. No.: WO2020/225311
PCT Pub. Date: Nov. 12, 2020

(65) Prior Publication Data
US 2022/0223029 A1    Jul. 14, 2022

(30) Foreign Application Priority Data
May 7, 2019    (DE) .................... 10 2019 111 854.9

(51) Int. Cl.
*G08B 25/14*    (2006.01)
*G08B 29/12*    (2006.01)
*G08B 25/00*    (2006.01)
*G05B 19/042*    (2006.01)
*G08B 17/00*    (2006.01)

(52) U.S. Cl.
CPC .......... *G08B 25/14* (2013.01); *G05B 19/0426* (2013.01); *G08B 25/003* (2013.01); *G08B 29/12* (2013.01); *G08B 17/00* (2013.01)

(58) Field of Classification Search
CPC ...... G08B 25/14; G08B 29/14; G08B 25/003; G08B 25/007; G08B 25/045; G08B 29/12;
CPC . G08B 26/008; G08B 27/005; G05B 19/0426
See application file for complete search history.

(56) References Cited

U.S. PATENT DOCUMENTS

| 5,768,119 A | 6/1998 | Havekost et al. |
| 10,063,629 B2 * | 8/2018 | Duncan ................ H05K 7/1498 |

(Continued)

FOREIGN PATENT DOCUMENTS

| DE | 102016120081 | 4/2018 |
| EP | 2533118 | 12/2012 |

(Continued)

OTHER PUBLICATIONS

International Searching Authority, International Search Report with English translation, International Application No. PCT/EP2020/062516, 5 pages; dated Aug. 28, 2020.

(Continued)

*Primary Examiner* — John A Tweel, Jr.
(74) *Attorney, Agent, or Firm* — Perkins Coie LLP

(57) ABSTRACT

The invention relates to a computer program product for configuration of a control center, in particular a fire alarm and/or extinguishing control center, and to an associated method. The computer program product comprises: a hardware configuration component for configuration of hardware components such as modules and/or front panel components of the control center, a logic configuration component for configuration of a functional logic of the control center, wherein the logic configuration component is designed to (Continued)

provide functional components. The functional components are decoupled from the hardware of the control center and embodied in such a way that reversible assignment of functional component to hardware component is made possible.

16 Claims, 13 Drawing Sheets

(56) References Cited

U.S. PATENT DOCUMENTS

| | | | |
|---|---|---|---|
| 10,818,161 B2 | 10/2020 | Mandelkau | |
| 11,300,940 B1* | 4/2022 | Plessing | G06F 9/547 |
| 2012/0068842 A1* | 3/2012 | Piccolo, III | G08B 17/00 |
| | | | 340/501 |
| 2018/0013579 A1* | 1/2018 | Fairweather | G06F 8/41 |
| 2021/0327256 A1* | 10/2021 | Otis | G08B 17/00 |

FOREIGN PATENT DOCUMENTS

| | | |
|---|---|---|
| WO | WO9727540 | 7/1997 |
| WO | WO2010037145 | 4/2010 |

OTHER PUBLICATIONS

International Searching Authority, Written Opinion with English translation, International Application No. PCT/EP2020/062516, 12 pages; Aug. 28, 2020.

* cited by examiner

CONFIGURATION SYSTEM AND COMPUTER PROGRAM PRODUCT FOR CONFIGURATION OF A CONTROL CENTER

PRIORITY CLAIM AND INCORPORATION BY REFERENCE

This application is a 35 U.S.C. § 371 application of International Application No. PCT/EP2020/062596, filed May 6, 2020, which claims the benefit of German Application No. 10 2019 111 854.9 filed May 7, 2019, each of which is incorporated by reference in its entirety.

TECHNICAL FIELD

The present invention relates to a computer program product for configuration of a control center, in particular a fire alarm and/or extinguishing control center, to an associated method and to an associated control center.

Background and Summary of the Invention

It is known that the configuration of control centers, for example of fire alarm and/or extinguishing control centers, is complex. In this regard, particularly in the case of relatively large systems, a large number of subscribers, such as detectors, alarm means, etc., and the behavior thereof have to be defined and coordinated with one another. Each subscriber, for example, has different requirements in respect of connections, control and evaluation.

However, the configuration is not only labor-intensive, but moreover susceptible to errors since the requirements, for example of standards, are stringent and the possibilities of configuration are manifold. It is also known that changes in the configuration can be implemented only with difficulty, and so often even small adaptations of the hardware necessitate a complete reconfiguration of the control center. The standards have different spatial areas of validity, inter alia, and so systems having the same protection goal may require different configurations depending on set-up location.

The term fire alarm systems denotes hazard alarm systems (HAS) which help persons directly to bring about a distress signal in the event of fire hazards and/or detect and report fires at an early point in time.

The term fire alarm control center (FACC) denotes part of the fire alarm system. It serves to receive, process and visually or acoustically present messages from fire detectors, to highlight and possibly record the detector group or the alarm region and also to monitor itself and the fire detectors and to indicate disturbances. In the event of fire detection, the fire alarm control center can pass on an alerting signal, e.g. to the fire department, or communicate a signal for the automatic fire protection device present, e.g. to a fire extinguishing system.

An electrical control device is an interface between fire detection part, usually the fire alarm control center, and extinguishing system. It converts fire detection signals from the fire alarm control center into control signals to the extinguishing system. The electrical control unit can be a dedicated assembly or an integral part of the fire alarm control center.

Commissioning is when the system is used as intended for the first time.

Inspection encompasses measures for ascertaining and assessing the actual state of a unit under consideration including determining the causes of wear and deriving the necessary consequences for future use.

Maintenance is the combination of all technical and administrative measures and also management measures during the lifecycle of a unit under consideration for sustaining the functional state or returning to the latter, such that it can fulfil the demanded function.

Repair encompasses measures for returning a unit under consideration to the functional state, with the exception of improvements.

The term extinguishing region denotes the totality of all regions in which an extinguishing agent is applied simultaneously in the case of fire.

The prewarning time concerns the time period between the beginning of the alerting for warning persons and the release of the extinguishing agent.

The term servicing denotes measures for delaying the reduction of the available margin of wear.

Approved means that something has been authorized by a competent authority.

The German Patent and Trademark Office searched the following prior art in the priority application with respect to the present application: EP 2 533 118 A1 and U.S. Pat. No. 5,768,119 A.

Against this background, it was an object of the present invention to specify a computer program product and an associated method enabling a particularly efficient and versatile configuration of control centers with few errors.

The invention proposes a computer program product, which can also be embodied as a configuration system, for configuration of a control center, in particular a fire alarm and/or extinguishing control center, comprising a hardware configuration component for configuration of hardware components such as modules and/or front panel components of the control center, and a logic configuration component for configuration of a functional logic of the control center. The logic configuration component is designed to provide functional components. The functional components are decoupled from the hardware of the control center and embodied in such a way that reversible assignment of functional component to hardware component is made possible.

According to the invention, accordingly, the computer program product for configuration of a control center enables the hardware of the control center to be decoupled from the logic of the control center. To put it another way, accordingly, it is firstly possible, by means of the logic configuration component, to create the set-up and to fill it later with hardware. The technology, for example loop technology, limit value technology, etc., which is configurable by the hardware configuration component can accordingly be defined at a late stage of development, which simplifies the development process. The decoupling of logic and hardware correspondingly reduces the complexity in the configuration of control centers.

The configuration principle can also be referred to as a function-oriented component concept. Firstly, a functional component is selected and included in the functional logic by means of the logic configuration component. The functional component represents a specific function. The functional component is subsequently married to a hardware technology, that is to say assigned to or linked with a hardware component or a front panel component. Finally, an assignment to physical connections and the definition of the adjustable parameters of the hardware components can be effected. These assignments or linkages can be effected at any arbitrary point in time during the creation of the functional logic, that is to say as early as after the inclusion of a single functional component, after the conclusion of the complete creation of the functional logic, or at one or more arbitrary points in time therebetween. As will also be described in even greater detail below, a change and adaptation of the assignment or linkage between hardware component/front panel component and functional component are also possible at any arbitrary point in time.

The logic configuration component is preferably designed to represent the functional components and to indicate both the function and the associated hardware in the representation of the functional component if the functional component is linked with a hardware component or front panel component.

Further advantages of the computer program according to the invention reside inter alia in the fact that all functions are available for all compatible hardware, without the need to provide a library of components for all combinations of function and hardware. The separation according to the invention enables a simple change of the hardware reference and a simple change of the hardware technology used, without the entire logic of the control center having to be adapted or reconfigured.

Functional components are preferably representations of functions of the control center which can be presented particularly preferably graphically by the logic configuration component. Some of the functional components may be able to be influenced in terms of their properties and their behavior by way of an inputtable configuration. The functional components preferably have inputs and outputs enabling them to be connected to other functional components. Complex projects can be realized by the connection of different functional components.

The functional components preferably comprise six groups of functional components: logic, standard, special, parameters, visualization and time. Functional components from the group logic preferably comprise "OR", "AND", "NOT", flip-flop, edge detection, "X out of N", "XOR", Max out of N, Multiplexer and Demultiplexer. Functional components from the group standard comprise: input, output, LED, commentary component and group dependence component. Functional components from the group special components comprise: message code, message, collective signal, access level, user reset, transmission device (TD) fire, TD status, PLC Start and Bus. The group parameters comprises the functional component switch, the group visualization comprises the functional component LED and the group time comprises the functional component delay.

In addition, a functional component "extinguishing component" is preferably provided, which enables the triggering and extinguishing of an extinguishing region, for example, to be configured in detail. Said extinguishing component implements a series of further structural components and programmed components, preferably in order to enable creation of a rule-conforming control for a gas extinguishing region in accordance with the strict rules of EN 12094-1.

Preferably, the logic configuration component is designed to add and remove functional components, to connect functional components to one another and to disconnect them from one another, and/or to allocate properties to functional components.

Preferably, the logic configuration component is designed to provide predefined combinations of functional components as locked combination components, wherein a combination component implements the logic of a complete extinguishing region, for example.

As a result, the complexity of the configuration of control centers can be significantly reduced since, in particular, complex requirements, such as of gas extinguishing systems, for example, can be fulfilled with a single, predefined logic component. By virtue of the fact that the combination component is locked, a subsequent change by the user is not possible. Conformity of the combination component, once provided, with the relevant standard is thus ensured.

Preferably, the logic configuration component is embodied to provide a representation of the functional logic, designated as logic circuit diagram, using the functional components and connections between the functional components.

Preferably, the hardware configuration component is embodied to provide two representations of hardware arrangements, wherein a first representation is embodied for configuration of hardware components at a rear side of the control center and a second representation is embodied for configuration of front panel components at a front side of the control center.

The representations are preferably indicated in different worksheets, between which it is possible to change over.

The worksheet or the representation for the rear side of the control center or a rear wall of the control center presents the free locations for positioning components. By way of example, a maximum of fourteen free mounting locations of a module rail can be presented. The representation is directed, of course, toward the conditions of the control center to be configured. Preferably, these locations can be equipped with hardware components, for example module components from a catalog, by means of drag-and-drop.

The control center is preferably operated via a central display and operator control panel area in the front panel. Messages are preferably presented on a touch display and displayed by LEDs. The operator control is preferably effected by means of pushbuttons and LEDs with defined functions and/or by means of the touching of designated areas on the touch display. The representation of the front panel components preferably enables the configuration of the display and operator control panel area.

Besides the central display and operator control panel area, the configuration of additional modules, for example of extensions of the operator control panel area, can be implemented.

Preferably, the hardware configuration component is embodied to enable the configuration of at least one, preferably a plurality and particularly preferably all, of the following hardware components: i) limit value module, ii) relay module, iii) control module, iv) loop module, v) voltage output and/or ground fault detection module, vi) fire department peripheral equipment module.

The limit value module serves for switching on various types of limit value detectors of standard and industrial design. It preferably feeds up to six connected detector lines with a constant supply voltage and detects their current consumption in the process. The detectors indicate events by means of a current increase. If the current exceeds or falls below the limit values predefined in a configuration-dependent manner, the limit value module generates corresponding messages and forwards them to a central processing unit of the control center. Typical events that are detected by the limit value module are: wire break in the detector line, quiescent current in the detector line too low (creeping wire break), short circuit in the detector line, quiescent current in the detector line too high (creeping short circuit), alarm or disturbance at one detector, alarm or disturbance at a plurality of detectors. The limit value module preferably contains secondary protection for reducing disturbance variables and overvoltages. An LED preferably indicates the operating state of the limit value module. The connections are preferably embodied as plugs for the respective limit value lines, two contacts in each case being united in one connection.

The relay module preferably contains eight relays with floating changeover contacts. A central processing unit for the control center switches the devices connected to the contacts on or off in an event- and configuration-dependent manner. There are preferably eight LEDs situated in the housing cover of the relay module, said LEDs indicating the control state of the relays. Each relay preferably has one LED fixedly assigned to it. One LED indicates the operating state of the relay module.

The control module is embodied to switch output channels, preferably six output channels, for alerting devices, valves and other consumers having a feed line that has to be monitored. The current is monitored separately and continuously for each output. This makes it possible, both in the quiescent state and during control, to monitor the outputs for wire break, short circuit, creeping wire break, creeping short circuit, connection plug that has fallen off or become detached, and overload. Control is preferably effected with delays or continuously depending on the configuration defined in the configuration program for the control center.

In the event of a predefined limit value being exceeded (as a result of overload or short circuit), the control output is preferably automatically switched off (current limiting). This is preferably indicated by a disturbance message of the control output on the touch display of the control center.

The method for monitoring the outputs is configurable (for example control with correct polarity/monitoring with opposite polarity). There are preferably six LEDs situated in the housing cover of the module, said LEDs indicating the control state of the outputs. Each output preferably has one LED fixedly assigned to it. Preferably, a further LED indicates the operating state of the module.

A multiplicity of alerting means can be connected to the control module. The respective manufacturer's documentation of the alerting means to be connected gives indications about concrete possibilities and limitations.

A multiplicity of valve units and monitoring devices can be connected to the control module. The respective manufacturer's documentation of the valve units and monitoring devices to be connected gives indications about concrete possibilities and limitations.

The loop module offers for example connection possibilities for two separate loops of detectors, input/output modules and signal transmitters. It feeds a constant supply voltage of preferably 27 V into the respective loop, and from this voltage the subscribers cover their power demand. The feed lines do not just feed the supply voltage to the subscribers of a loop. In addition, information in the form of a protocol is communicated. Subscribers are thus automatically recognized and configured on the basis of their individually settable subscriber address. Each loop can alternatively be divided into two spur lines. In this case, however, it must be taken into consideration that each two spur lines are logically associated with one another. The same subscriber addresses must not be used on each spur pair. An LED preferably indicates the operating state of the module. Preferably, up to two loops or four spurs can be connected.

The voltage output and/or ground fault detection module (referred to hereinafter as voltage output-EFD module, "earth fault detection") serves for connecting external consumers that should not be treated like a control group. No wire break monitoring takes place. This module preferably comprises two outputs, each having a rated voltage of preferably 24 V and a loading capacity of preferably 2 A. They are preferably equipped with a filter system that prevents spurious EMC radiation from entering the control center. In addition, the outputs are preferably provided with an electronic fuse that ensures the protection function of the outputs even in the event of a failure of both CPUs. If the maximum output loading capacity is permanently exceeded by a load, the output is preferably switched off automatically (load shedding). Moreover, if necessary, the voltage output-EFD module preferably affords the possibility of monitoring the galvanic isolation between the protective earth (PE) and the second DC voltages including ground (GND) as reference potential, in order thus to realize ground fault monitoring. The voltage output-EFD module preferably makes available four PE measurement inputs for this purpose. The voltage output-EFD module preferably contains at the top a block of two LEDs, which indicate different operating states of the outputs.

The fire department peripheral equipment module serves for connecting a transmission device (TD) for example for fire and/or disturbance messages, and for switching on various pieces of fire department peripheral equipment. The fire department peripheral equipment includes fire department key safes (FDKS), position luminaire, key switches (KS), key safe adapters (KSA), fire department control panels (FDCP) and fire department display panel (FDDP) and also transmission devices (TD) for fire and disturbance messages. The module preferably conforms to DIN 14661—fire department control panel.

Preferably, the hardware configuration component is embodied for implementing at least one, preferably a plurality and particularly preferably all, of the following functionalities: i) assigning a subscriber to a hardware group, ii) configuring the front panel components with collective signals, for example fire, iii) integrating the layout of the control center.

Preferably, the computer program product is embodied to provide a graphical user interface, wherein the graphical user interface presents representations of the hardware configuration component and of the logic configuration component simultaneously, for example next to one another, or interchangeably, for example in the form of tabs.

Preferably, the different representations are presented in so-called worksheets that are freely arrangeable and displaceable. The display is possible on any arbitrary output device, for example local screens, projectors, etc.

Preferably, the computer program product is designed to make all changes reversibly, in particular by means of the hardware configuration component and/or the logic configuration component.

This makes it possible to reverse even relatively complex steps in order to avoid a loss of time as a result of unwanted changes.

Preferably, the computer program product furthermore has a logic checking component, wherein the logic checking component is designed in particular to check at least one, preferably a plurality and in particular all, of the following parameters and functionalities: i) compliance with value ranges, ii) double allocation of group numbers, iii) nonsensical or incorrect interconnection of functional components, hardware components and/or front panel components, iv) free inputs and outputs at functional components, v) hardware configuration problems.

Accordingly, the logic checking component is suitable for carrying out a check of the configuration before the possibly erroneous configuration is transmitted to the control center. An erroneous function of the control center is thus avoided.

Preferably, the computer program product is embodied to present an output of the logic checking component simultaneously with a representation of the hardware configuration component and/or of the logic configuration component in the graphical user interface.

Preferably, the computer program product furthermore has a standard conformity component, wherein the standard conformity component is embodied to check conformity of the configuration of the control center with a desired one of a plurality of standards provided.

With regard to fire protection devices, that is to say for example fire alarm and/or extinguishing control centers, the following standards, in particular, are relevant: "EN Europe standard", "FM standard", "UL standard" and the requirements over and above those as defined by the VdS, which are preferably explicitly or implicitly included. The standard conformity component thus makes it possible to carry out a check of the conformity of the created configuration with the selected standard before the configuration is transmitted to the control center. Moreover, this enables a conformity verification that can be created with particularly low outlay and high reliability.

Preferably, the computer program product furthermore has a communication component for bidirectional communication with the control center, wherein the communication component is embodied for transmitting the configuration to the control center and for transmitting the configuration from the control center, wherein the communication component is preferably embodied to carry out a version comparison with the control center, and to transmit the configuration to the control center only if the version of the computer program product corresponds at least to the version of the control center.

The communication component accordingly ensures that a transmission between computer program product and control center and in the opposite direction from the control center to the computer program product functions without any problems. By virtue of the version preferably being compared, it is possible to prevent incompatible configurations from being transmitted. Preferably, the computer program product is downward-compatible with regard to the version of the control center. If the version of the computer program product is out of date, an update function can preferably be provided, which enables the computer program product to be updated, preferably by the Internet. The communication component can alternatively also be embodied from a separate receiving component and a transmitting component.

Preferably, the computer program product furthermore has a simulation component for simulating the configuration.

The simulating makes it possible to check whether the control center exhibits the desired behavior, without the configuration having to be transmitted to the control center for this purpose. The time that needs to be expended for checking the configuration is thus significantly reduced since, for example, the time for transmitting the configuration to the control center is omitted. In this regard, the efficiency of troubleshooting possibly undesired behavior is also increased.

The simulation component is preferably embodied for online simulation of the configuration with the inclusion of the control center and for offline simulation of the configuration without the inclusion of the control center. In this case, online simulation means that user inputs and triggerings at the control center, for example triggered detectors and/or pressed buttons, are transmitted directly to the computer program product and the behavior of the control center, in particular the signal profile within the functional logic, is immediately visible. By way of example, a signal profile can be represented by means of highlighted functional components and/or connection lines by means of the logic configuration component. To put it another way, the online simulation preferably enables a real-time representation of the real behavior of the control center to be generated by the computer program product. In the case of offline simulation, the connection to the control center is not required. In this case, the signals, inputs and the like are input directly in the computer program product.

Particularly preferably, in the case of online simulation, the present configuration of the control center is compared with the configuration of the hardware configuration component and logic configuration component using the communication component. Both alternatives are conceivable, that is to say that the configuration is imported from the control center or the configuration created by the computer program product is transmitted to the control center.

Preferably, the computer program product furthermore comprises a documentation component for documenting the configuration of the control center.

The invention furthermore proposes a method for configuration of a control center, in particular a fire alarm and/or extinguishing control center, using a computer program product according to the invention.

The method using the computer program product according to the invention usually comprises the following steps: selecting and adding functional components, for example from a library; defining properties of the functional components such as group number, message texts, fire situation control, acoustic alarm, timing controls, etc., connecting the functional components and assignment to hardware, testing the configuration by means of simulation on PC or at control center. Of course, any arbitrary computer device suitable for executing the computer program product can also be used instead of a PC.

The invention furthermore proposes a control center, in particular a fire alarm and/or extinguishing control center, comprising a communication module, wherein the communication module is embodied to receive data for configuration of the control center from a computer program product according to the invention and to transmit data, in particular data for configuration and real-time data for online simulation, to the computer program product according to the invention.

BRIEF DESCRIPTION OF THE DRAWINGS

Further advantages and preferred configurations are described below with reference to the accompanying figures, in which.

MODE(S) FOR CARRYING OUT THE INVENTION

Figure 1:
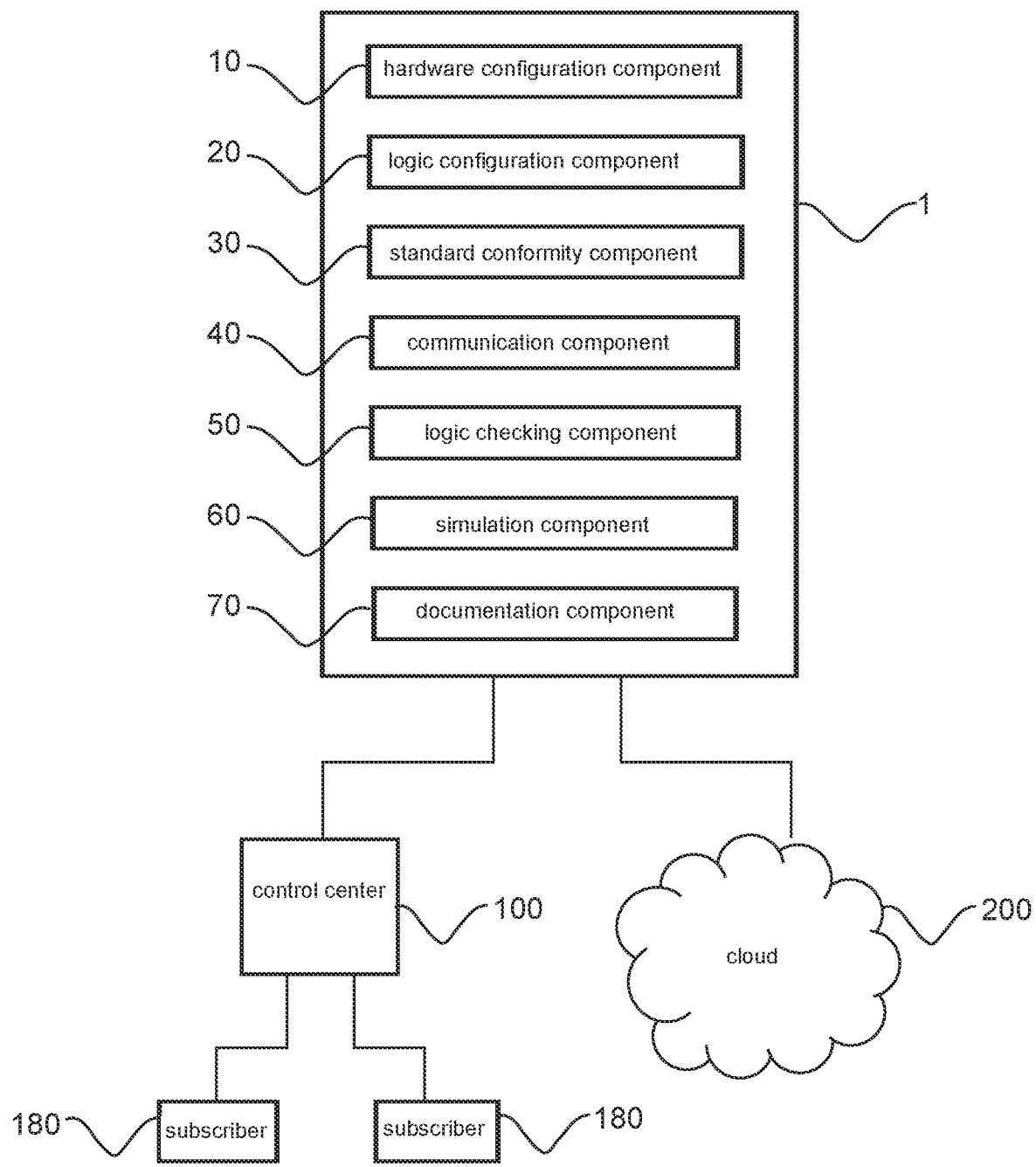
FIG. 1 shows schematically and by way of example a set-up of the computer program product according to the invention.

FIG. 1 shows schematically and by way of example a set-up of a computer program product 1 according to the invention for configuration of a control center 100, in particular a fire alarm and/or extinguishing control center. The complete computer program product 1 may also be designated as a configuration system for configuration of the control center 100.

The computer program product 1 comprises a hardware configuration component 10, a logic configuration component 20, a standard conformity component 30, a communication component 40, a logic checking component 50, a simulation component 60 and a documentation component 70. All of the components 10-70 of the computer program product 1 can consist completely or partly of software and/or hardware. Moreover, it is possible for the computer program product 1 to be arranged partly or completely at different spatial locations, for example on a computer PC, a server, a cloud, or a combination thereof. The preferred application is the one in which a user configures the control center 100 on a PC by means of the computer program product 1. A plurality of subscribers 180 are coupled to the control center 100, two of which subscribers are shown by way of example.

The computer program product 1 is embodied for communication with control center 100 and also a cloud 200. Functionalities of the individual components are described in detail below with reference to the further FIGS. 2-15.

Figure 2:
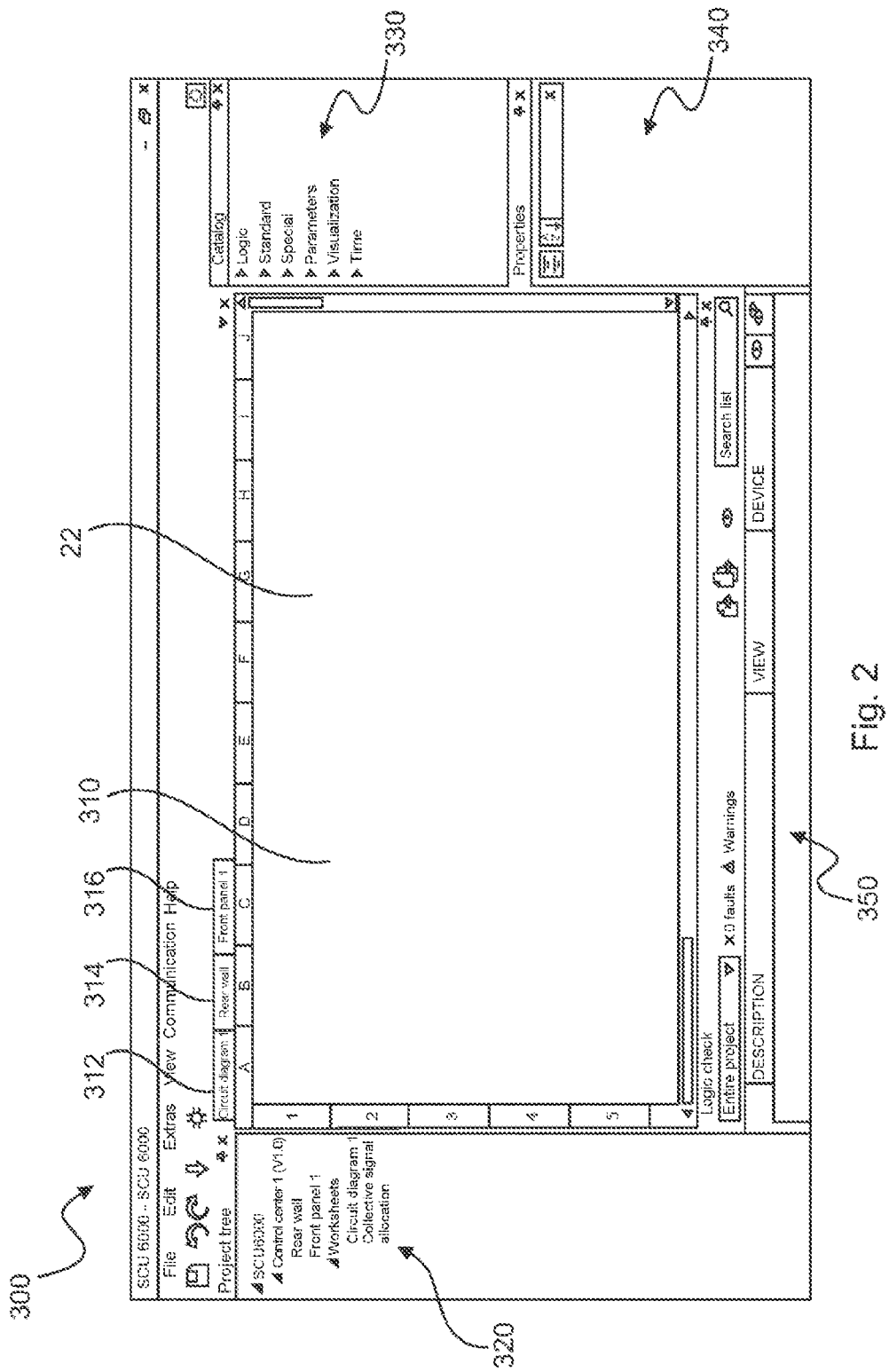
FIG. 2 shows schematically and by way of example an illustration of an operator interface of a computer program product according to the invention.

FIG. 2 shows schematically and by way of example an illustration of an operator interface 300, showing an output of the computer program product 1 according to the invention. The operator interface 300 is illustrated as a typical window arrangement, for example, where only the elements relevant to the function and the achievement of the technical effect of the computer program product 1 according to the invention are described below.

A work area 310 is illustrated centrally. The work area 310 presents for example a representation in the hardware configuration component 10 and/or the logic configuration component 20. In this exemplary embodiment, the representations—also referred to as worksheets—of said components are selectable in the form of tabs 312, 314 and 316.

A changeover between the representations of the different components 10, 20 is effected by clicking on respective buttons of the tabs 312, 314, 316. In this exemplary embodiment, a circuit diagram is presented as a representation 22 of the logic configuration component 20.

A project tree can be seen in an operator control area 320 of the operator interface 300. A catalog 330 provides various functional components that are selectable for the representation 22. In particular, functional components from the catalog 330 can be positioned and arranged on the representation 22, i.e. in particular the circuit diagram shown schematically, by means of drag-and-drop.

Properties of the currently selected object are presented in a property area 340. Finally, an output area 350 of the logic checking component 50 is illustrated, which will be described in detail with reference to FIG. 4.

By way of the project tree in the operator control area 320, for example new worksheets or further tabs 312, 314, 316 can be able to be created. By way of example, a new circuit diagram, i.e. a representation or output of the logic configuration component 20, can be created. The catalog 330 always presents the elements which appropriately match the currently selected view, i.e. the tab currently selected in the work area 310, and which can be positioned on the respective worksheet.

Figure 3:
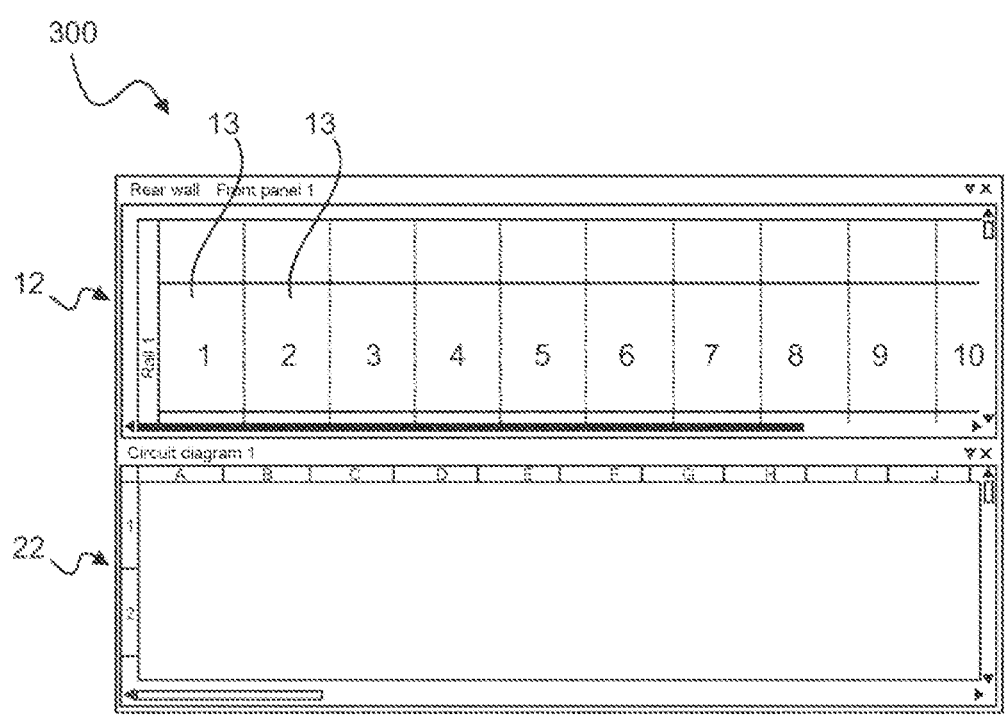
FIG. 3 shows schematically and by way of example an extract from the operator interface.

FIG. 3 shows schematically and by way of example an extract from the operator interface 300 which presents a representation 12 of the hardware configuration component 10 besides the representation 22 of the logic configuration component 20. Instead of the worksheets selectable by means of tabs 312, 314, 316, therefore, a simultaneous presentation of the representations 12 and 22 is possible in FIG. 3.

In this example, the representation 12 shows an arrangement of possible hardware components such as modules on a rear side of the control center 100. The hardware components e.g. modules, can be inserted at various positions 13 provided for them. In this example, a rail with positions 13 situated next to one another can be seen, while control centers 100 typically have a plurality of rails with positions 13 for modules.

In this example, the representations 12, 22 are presented one vertically below the other; of course, any other relative positions, for example horizontally next to one another or independently of one another, are also possible.

A configuration is usually created in the following steps: positioning the module components according to the arrangement of the physical modules in the switchgear cabinet, allocating the displays and operator control elements on a front panel and the region operator control panel areas, cf. FIGS. 8 to 10, creating the configuration on the basis of the circuit diagram as in the representation 22.

The logic checking component 50 is designed to check a configuration. As a result of the logic check, the logic checking component 50 outputs warnings and faults found as a list in the output area 350. Warnings constitute indications which do not make a function of the configuration impossible and are to be taken into consideration. Faults prevent the configuration from being transmitted to the control center 100.

Figure 4:
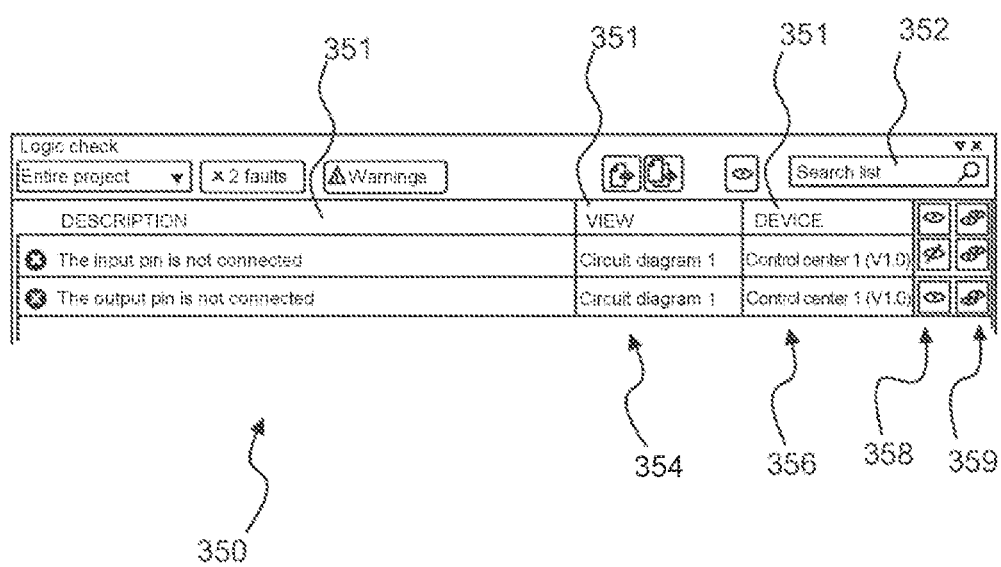
FIG. 4 shows schematically and by way of example an extract from the operator interface.

FIG. 4 shows schematically and by way of example the output area 350 of the logic check in detail. Preferably, the logic checking component 50 makes it possible to enter a term in a search field 352 and to reduce the result list to all entries that include the search term.

A display of the output of the logic checking component 50 can be adapted and filtered. In order that the user recognizes that not all of the warnings are displayed, the presentation is changed in the toolbar for example "1 warning" to "0 of 1 warning".

Selecting the description of a fault in the output area 350 of the logic checking component has the effect of jumping for example to the object, element, functional component, which triggered the fault (also hidden worksheets). The object, element, functional component are presented with a blue border around them, for example.

Preferably, the logic checking component 50 is called automatically before the configuration is transmitted to the control center 100. If faults are detected, the configuration is prevented from being transmitted to the control center 100.

It is usually not possible for the project to be changed while the logic check is being carried out. In this respect, a modal window can be displayed which gives notification that the logic check is underway and/or presents a progress bar and/or provides a cancel option. Once the checks have been completed or the user cancels the checks, the modal window is closed. The entries generated by the checks are preferably already presented in the window during the course thereof.

The fault description can preferably be copied to the clipboard by way of the context menu or [CTRL+C]. If an entry is selected, the cursor jumps to the point at which the fault message was generated. The entries have to participate in language switching. There are a number of columns in the output area 350 of the logic checking component 50. In a column "View" 354, a location designation is displayed. This can be the name that was allocated for the designation of an editor. In a column "Device" 356, the device on which the entry was generated (e.g. control center 1) is displayed. A version designation defined by the user is additionally indicated in this column.

For each message of a logic check, in a column 358 with a one-eye symbol in the table header, a changeover switch for visibility is displayed in each row of a fault message. After the actuation of the changeover switch, the one-eye symbol is shown scored through and the associated message is masked out. The selection of visibility is also maintained for a renewed logic check. Messages taken note of by the user can thus be individually masked out in order to increase the clarity of the result list.

In a further column 359, a two-eye symbol is presented. For each message, in this column there is a respective changeover switch for the visibility of each individual message. Messages of the same type can be masked out by means of this changeover switch.

A sorting function is linked with the fields of the header row 351, by means of which the contents of the result list can be sorted by selecting the corresponding column heading. During sorting by way of the header row 351, an arrow becomes visible in the corresponding field and indicates whether ascending or descending sorting is effected. With renewed selection of the same field, the sorting order changes to its respective opposite.

The content of the list of the output of the logic checking component 50 can be exported as a file. In this case, a format that supports unicode should be chosen (e.g. *.rtf). If an export is selected, an export destination (file) has to be input by the user. The following export is possible by way of a context menu: selected entries are exported or all entries are exported.

In order to reduce the number of messages when searching, at the top right in the tool bar there is the option of filtering messages according to specific texts. If a text is input in the search mask 352 and for a moment no input takes place, the list is searched for the search text. Entries containing the search text are displayed in the list. The searched text should be underlined. Deleting the text displays all entries in the list again. If at least one letter is input, the magnifying glass symbol is replaced by "Close". If Close is actuated, the search text is deleted and all entries in the list are displayed again. Selecting "arrow downward" displays the last five search texts.

Figure 5:
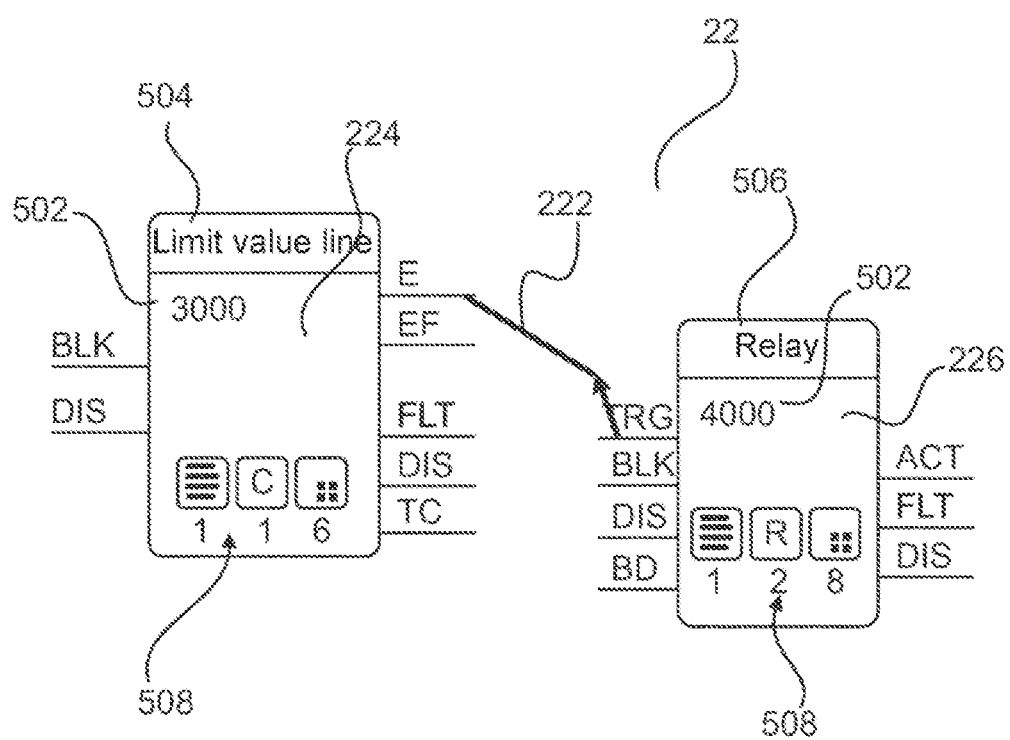
FIG. 5 shows schematically and by way of example an extract from the operator interface.

FIG. 5 shows schematically and by way of example an extract from a logic circuit diagram embodied as a representation 22 of the logic configuration component 20. Two functional components 224, 226 are arranged on the logic circuit diagram. The functional components 224, 226 are taken from the catalog 330 (cf. FIG. 2), for example. Once arranged on the worksheet, i.e. the representation 22, the two functional components 224, 226 can be connected by a connection line 222 by means of clicking. In this case, two input or output pins of the two functional components 224, 226 are connected to one another.

Connections can preferably only be created between two input and output pins that match one another logically or in terms of the data format. The functional logic of the control center 100 is therefore created by means of the logic configuration component 20. In this example, the connection line 222 is produced between an input E of the functional component 224 and an input TRG of the functional component 226. The functional components 224, 226 and connections 222 therebetween can be able to be set as desired by means of the logic configuration component 20.

In the example in FIG. 5 hardware units, i.e. modules, have already been assigned both to the functional module 224 and to the functional module 226, as can be discerned from the position indication 508 in the lower region of the representation of the functional module 224, 226. This is effected after linkage with a hardware component of the hardware configuration component 10, for example with a limit value module 504 in the case of the functional module 224. The functional component 224 is an input module and the functional module 226 is an output module, which will also be described below. The functional logic linked with both functional components 224, 226 is independent of the hardware linked therewith and, to put it another way, independent of the relation to the limit value module 504 and the relay module 506, respectively.

A group number 502 can likewise be seen on the worksheet for each functional component 224, 226, said group number being editable in the property area 340 (cf. FIG. 2) after the respective functional component 224, 226 has been selected.

Figure 6:
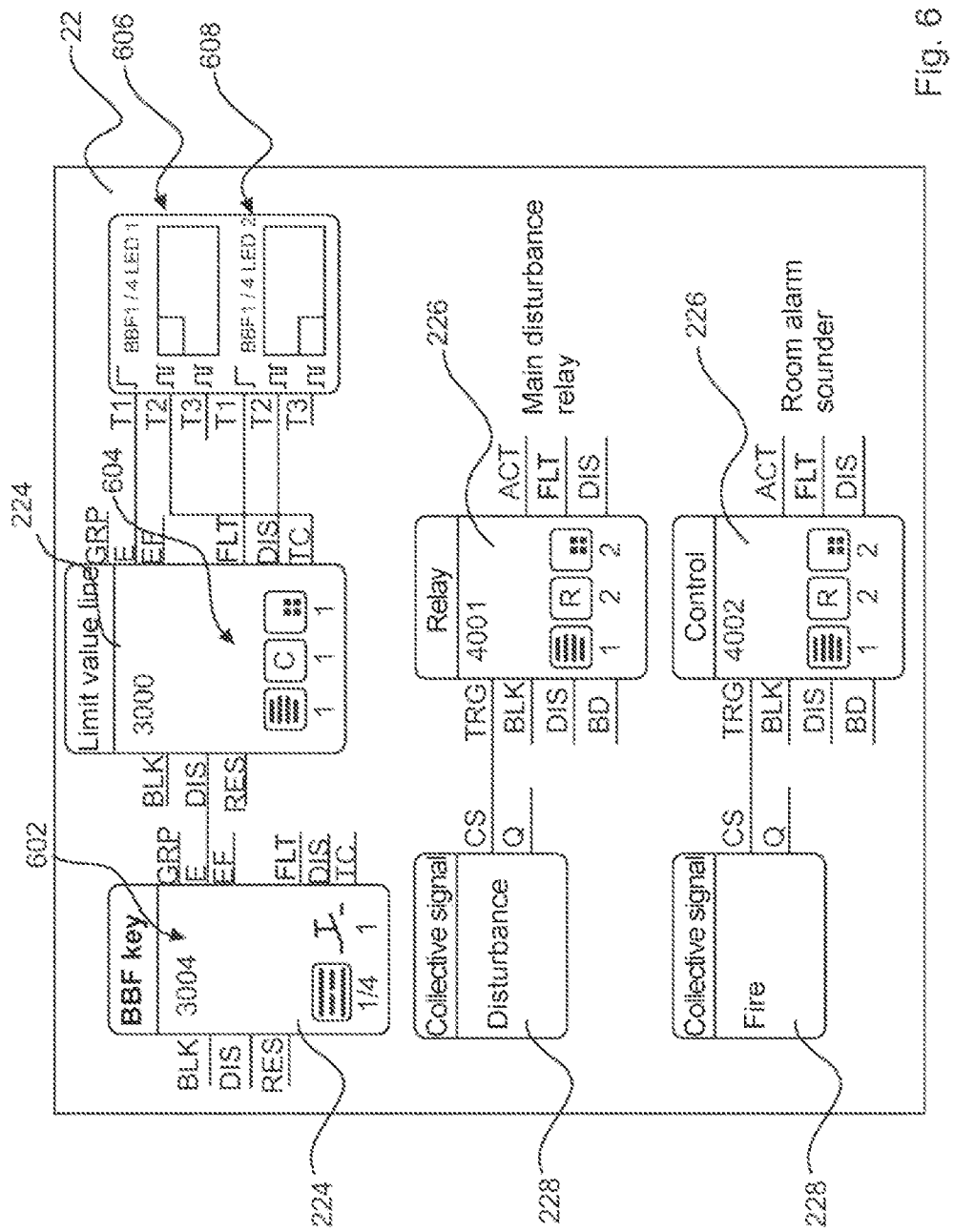
FIG. 6 shows schematically and by way of example an extract from the operator interface.

FIG. 6 shows schematically and by way of example a further embodiment of the representation 22 of the logic configuration component 20, in which a plurality of functional components and the linkages thereof are arranged. In particular, two input functional components 224, two output functional components 226 and also two collective signal functional components 228 are linked with one another.

The two input functional components 224 constitute inputs of an operator control panel area key 602 and of a limit value line 604. The operator control panel area key 602 can be arranged for example on a front panel of the control center 100, cf. FIG. 8.

The two input functional components 224 are then connected to the output units in the form of LEDs 606, 608, which are likewise arranged on the front panel of the control center 100. Here, too, firstly the functional logic, i.e. the two input functional components 224 and two associated display elements, is defined before these are married to actual hardware.

Consequently, the logical structure does not depend on the actual hardware configuration of the control center 100 and is diversely usable, transferrable and adaptable to the actual design and hardware availability of the control center.

Figure 7:
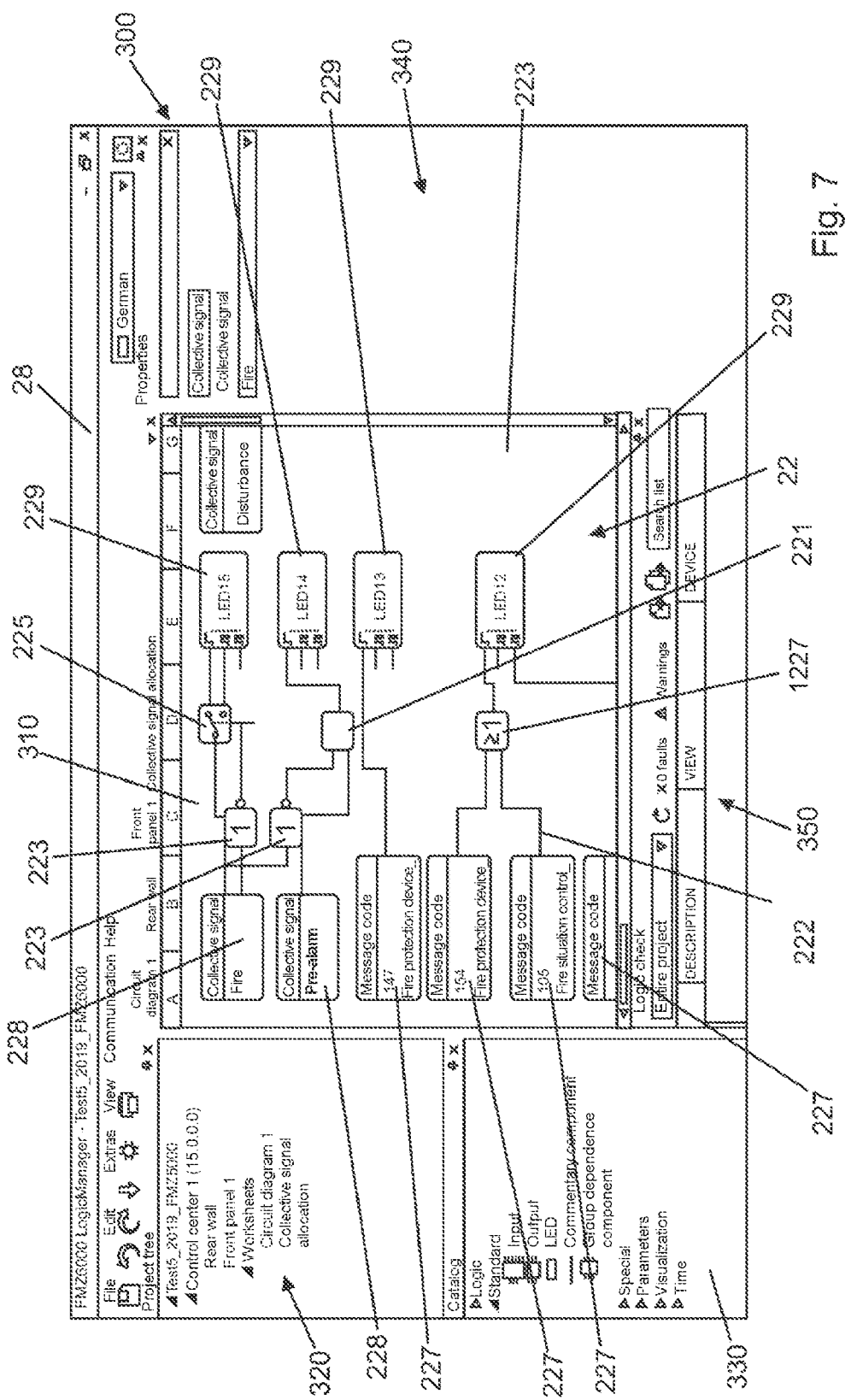
FIG. 7 shows schematically and by way of example an extract from the operator interface.

FIG. 7 shows schematically and by way of example a further view of a logic circuit diagram as a representation 22 of the logic configuration component 20. Various functional components 221-229 are presented without a hardware reference in this configuration, some of which functional components are explained below.

Accordingly, a description of particularly preferred functional components follows below. It should be taken into consideration that other, different or additional functional components are also possible and advantageously usable, and also that not all of these functional components are illustrated in one or more of the accompanying figures:

OR 1227: sets the output to 1 if at least one of an arbitrary number of inputs is set to 1. Change the number of inputs by expanding the component at the upper or lower edge.

AND 221: sets the output to 1 if all the inputs are set to 1. Change the number of inputs by expanding the component at the upper or lower edge.

NOT 223: inverts the input state; sets the output to 1 if the input is set to 0, and sets the output to 0 if the input is set to 1.

Flip-Flop: serves for storing signal states with a defined reset behavior. A state at the output is retained until a state at the set input (S) or reset input (R) changes. The output state can be defined under "Properties" in a drop-down menu as "with priority for setting" (FFS) or "with priority for resetting" (FFR). FFS: sets the output to 1 as soon at the set input is set to 1. FFR: sets the output to 0 as soon as the reset input is set to 1.

Edge detection: detects a state change at the input in the form of an edge. The fact of whether the component is intended to detect a rising edge or a falling edge can be defined under "Properties" in the drop-down menu. Sets the output to 1 if a rising edge is detected at the input, or sets the output to 1 if a falling edge is detected at the input.

X out of N: the output OUT is set if the number of inputs IN0-IN7 set (logic 1) is at least equal to the number predefined by the value X.

XOR: sets the output to 1 if one input is set to 0 and one input is set to 1.

Max out of N: switches only a specific number of input signals through to the corresponding outputs thereof. If the component limits the number, the output (Lim) limited list is set. Example: if the supply of extinguishing agent in a project is limited, a limitation of simultaneously controlled extinguishing regions can be achieved by means of the component. Change the number of inputs by expanding the component.

Multiplexer: if the input "S control signal" is allocated the logic value 0, then a logic value present at input In1 is forwarded to the output Out. If the input "S control signal" is then set to logic 1, the logic value present at input In2 is forwarded.

Demultiplexer 225: if the input "S control signal" is allocated the logic value 0, then a logic value present at input In is forwarded to the output Out1. If the input "S control signal" is then set to logic 1, the logic value present at input In is forwarded to the output Out2. The open output has the logic value 0.

Input 224: evaluates incoming signals and transmits information to the control center; cf. for example functional component 224 in FIG. 5.

Output 226: evaluates signals from the control center and transmits them to subscribers; cf. for example functional component 226 in FIG. 5.

LED 229: serves for assigning LEDs on the front panel or on the region operator control panel areas (component serves for the visualization of binary states in the commissioning mode "Simulation" or "Online").

Commentary component: The text contains further information of the configuration. It is inserted on the worksheet. The text commentary can be entered in the text editor field via the Property area and adapted. The position of the commentary component can be positioned in any desired way.

Group dependence component: The group dependence component forms the function of a multi-group dependence. This means that the required number (Variable X) of the detector groups connected to the inputs (G) must be in the state "Event" simultaneously before the message is displayed and the output (E) becomes active. The detector group connected to the input (REF) must additionally be in "Event" anyway in order to fulfil the dependence.

The control of the transmission device to the fire department (no control, immediate control, delayed control, day/night control) can be configured by way of the properties of the functional component. The TD is controlled only after fulfilment of the variable "X" and an event signal at input (REF).

The connected automatic fire detector groups at the inputs Gx are intended to signal the message code pre-alarm in the event. For this purpose configure the properties of the functional component of the detector group. Events of the respective group are always transmitted via the data line. That takes place independently of the message code. Arbitrary messages can thus be switched in dependence.

Message code 227: the component serves as a filter for the message code chosen. The output is activated as soon as a message with this message code is present in the FACC. Can be configured with a message code (by means of drop-down menu in the area "Properties"). The output remains at 1 as long as a message with the configured message code exists.

Message: generates a message as soon as the input is at 1. (The message can be configured by means of a drop-down menu in the area "Properties"). The message resets itself. As soon as the input is at 0, it is taken back again. The functional component generates a message in the case of an active input signal, said message being displayed on the display of the fire alarm control center. In the case of networked control centers, said message is also relayed further and can initiate commands and controls in other control centers.

Collective signal 228: can be configured with a collective signal (by means of a drop-down menu in the area "Properties" 340). The output remains at 1 as long as a message with the configured collective signal exists. The collective signal component makes available at its outputs the most important collective signal states of a control center of the PLC. In the case of networked control centers, in the main control center a collective signal component can be set for each control center. As a result, the collective signals of each control center are generated e.g. for controls.

Access level: the component provides a binary signal as soon as the corresponding access level is activated. Reports to the control center which access level is currently active. The access level can be configured by means of a drop-down menu in the area "Properties". The dependence on access levels of the BBF inputs can be configured directly at the functional component by way of the properties.

User reset: the output is set to logic 1 after a user reset for two complete PLC cycles. For resetting storing components or connected third-party products after a user reset. For pulse lengthening, a switch-off delay can subsequently be set. Sets the output to 1 until a user reset is carried out.

TD fire: triggers the transmission device (TD).

TD status: reports to the control center the status of the transmission device. The states "Fire" and "Disturbance" can be configured by means of a drop-down menu in the area "Properties". This component represents the outputs of the TD status module which are parameterized in the hardware configuration. It can be set at most twice in the project. (max. 2 TD, fire, disturbance).

PLC start: the output becomes active for at least one full cycle upon the start of the PLC. The component enables unambiguous states to be set after the start of the PLC. A switch-off delay can subsequently be set for the purpose of lengthening the pulse.

Bus: change the number of inputs by expanding the component at the upper or lower edge. The bus configuration provides information about which bus components are connected to one another.

Switch: parameter component that simulates on and off states of a switch. Can be activated in the area "Properties".

LED: visualizes an LED. The LED lights up red, for example, if the input is set to 1. If the input is set to 0, it remains grey. The component serves for the visualization of binary states.

Delay: time component for switch-on and switch-off delay. Time predefinitions and behavior can be configured in the area "Properties". Switch-off delay, switch-on delay, pulse. A logic 1 at the input IN sets the output OUT. If the input signal goes to logic 0, the output signal is set to logic 0 later after the delay time set. The delay time can immediately be cancelled via the input "RE reset".

In FIG. 7, the functional components 221-229 are not assigned to any hardware, i.e. the logic is presented independently of the hardware used in the representation 22.

Figure 8:
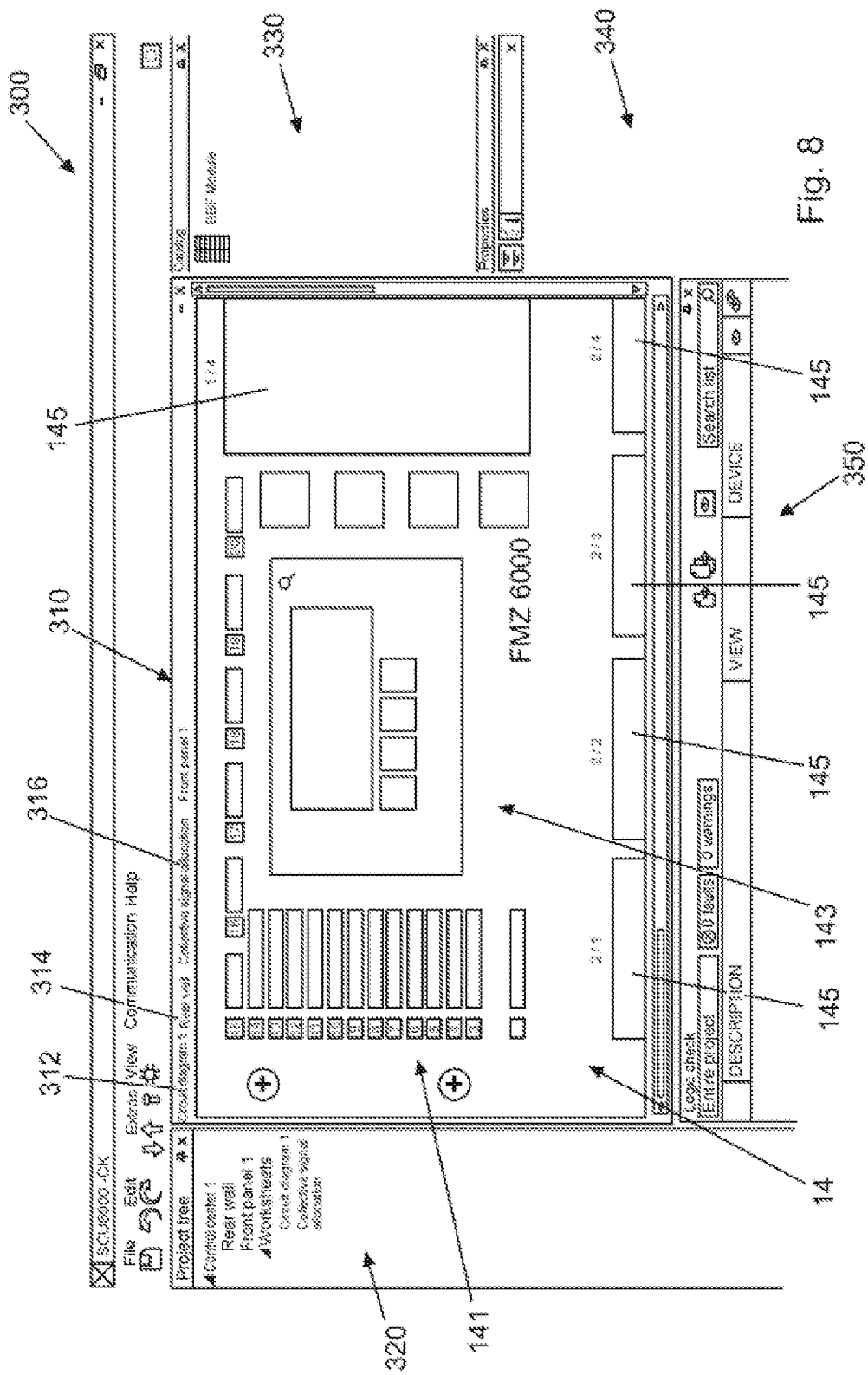
FIG. 8 shows schematically and by way of example an extract from the operator interface.

FIG. 8 shows schematically and by way of example a further view of the operator interface 300, wherein a further representation 14 of the hardware configuration component 10 is displayed in the work area 310. The representation 14 is a presentation of the front panel of the control center 100. The representation 14 is a presentation such as faces a user looking at the physical control center 100 from the front. The front panel comprises a plurality of displays and labelling fields 141, a central operator control display 143 and a plurality of expansion locations 145, at each of which an operator control panel area module 150 (cf. FIG. 9) from the catalog 330 can be inserted by means of drag-and-drop. The front panel shown in the representation 14 thus comprises output hardware, i.e. the displays and LEDs 141, and equally input hardware, for example various pushbuttons. Output and input components can be linked with functional components 221-229.

Figure 9:
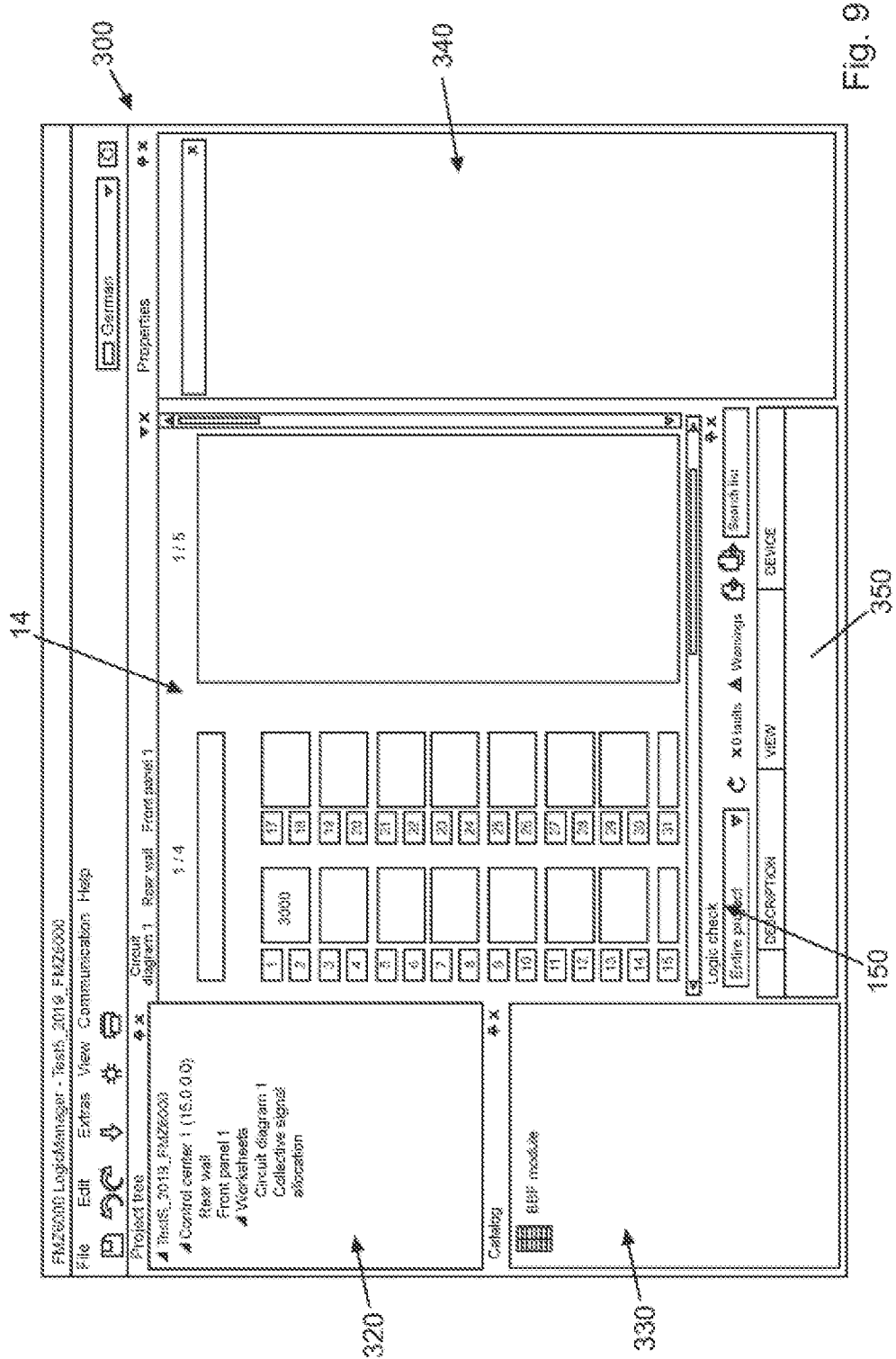
FIG. 9 shows schematically and by way of example an extract from the operator interface.

FIG. 9 shows schematically and by way of example a detailed view of an operator control panel area module 150 inserted at one of the locations 145 provided therefor. This is therefore a detailed view of the representation 14. The operator control panel area module 150 comprises a plurality of input and output elements, such as LEDs and/or pushbuttons. Moreover, a labelling area can be arranged in a region next to the LEDs, for example in order to identify different subscribers and/or groups.

Figure 10:
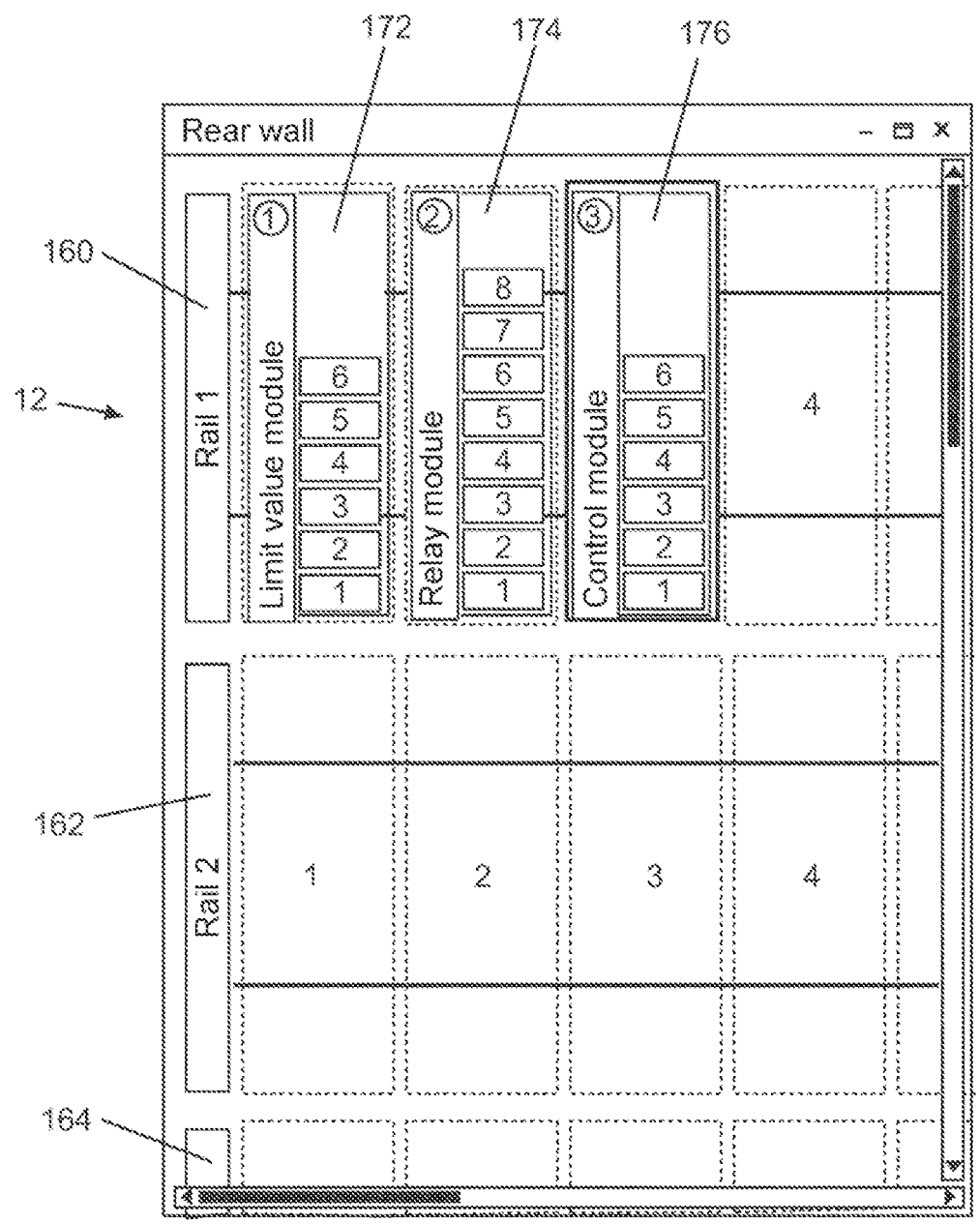
FIG. 10 shows schematically and by way of example an extract from the operator interface.
Figure 11A:
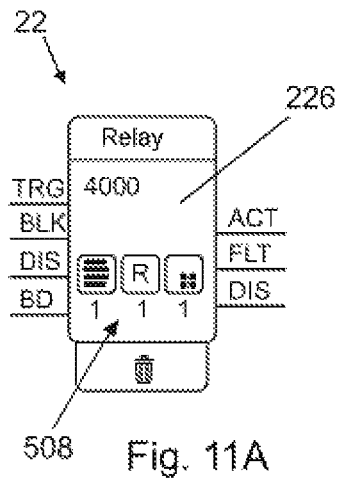
FIGS. 11A-11D show schematically and by way of example extracts from the operator interface.
Figure 11B:
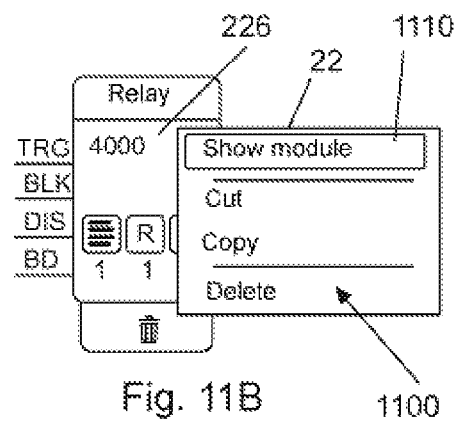
Figure 11C:
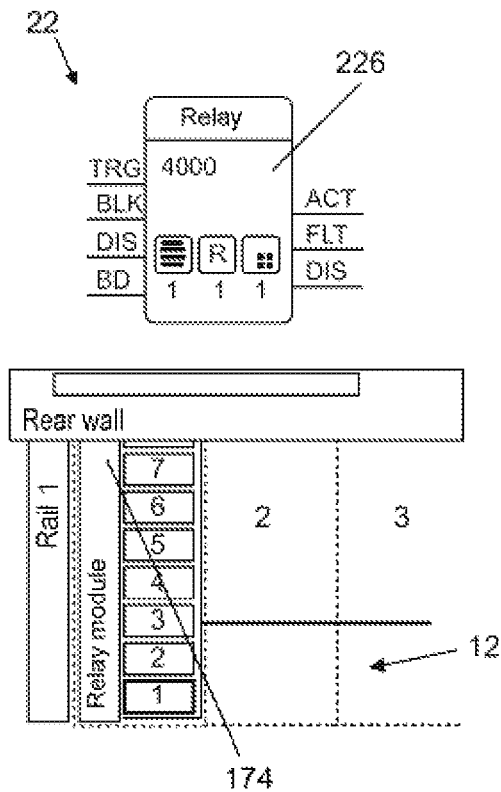
Figure 11D:
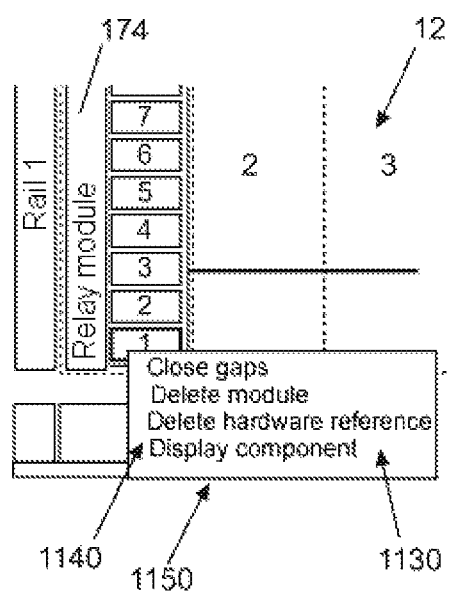

FIG. 10 shows schematically and by way of example the representation 12 of a rear wall of the control center 100. Three rails 160, 162, 164 are shown, on which a plurality of modules 172, 174, 176 situated horizontally next to one another can be arranged. The modules 172, 174, 176 are accordingly hardware components that are actually installed in the control center 100.

In the context of the computer program product 1 according to the invention, modules 172, 174, 176 from the catalog 330 (not shown in FIG. 10) can be drawn to the corresponding position. In this example, the module 172 is a limit value module, the module 174 is a relay module, and the module 176 is a control module. Any desired combination of the modules described above is conceivable.

FIGS. 11A-11D show schematically and by way of example how a functional component 226 linked with a hardware component, for example the relay module 174, can be separated from the hardware reference.

By way of a context menu 1100 brought about by means of the right-hand button of a mouse, for example, the module associated with the functional component 226, here the relay module 174, can be displayed by means of a button 1110. The position 508 here refers to the first relay of the relay module 174, which is arranged on the first rail at the first position, cf. FIG. 11C.

If a context menu 1130 is called up on the relay module, for example by means of the right-hand button of a mouse being pressed, then the hardware reference can be deleted therein by way of a button 1140. Moreover, it is possible to display or highlight the associated component 226 in the representation 22 by way of a button 1150.

Figure 12:
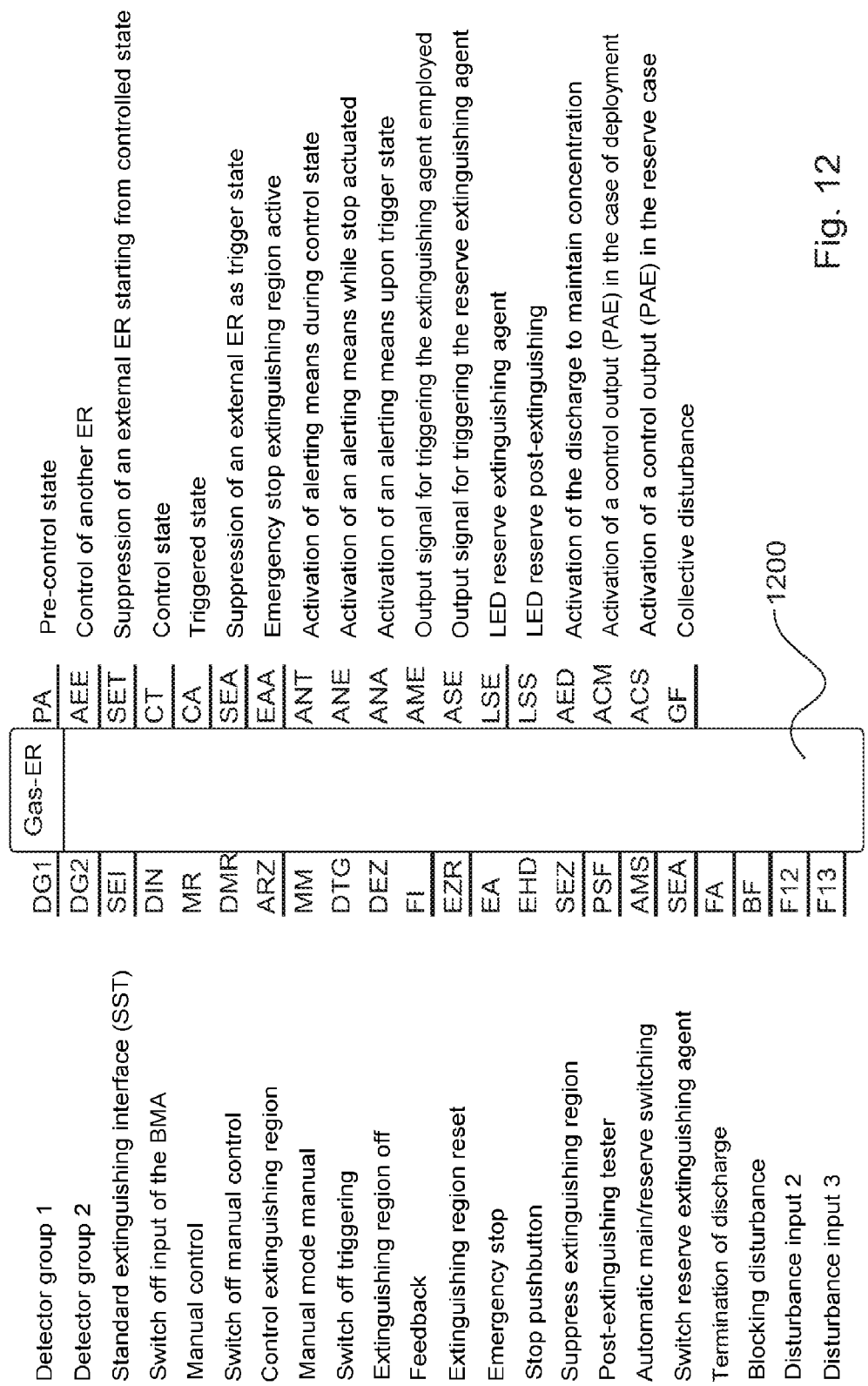
FIG. 12 shows schematically and by way of example a combined functional component.

FIG. 12 shows schematically and by way of example a functional component 1200 that unites a combination of a plurality of further, simpler functional components, which is available as an unchangeable, locked functional block.

An entire gas extinguishing region is represented by means of the functional component 1200. An entire extinguishing region control can thus be carried out by a single programmed functional component 1200. As a result, the processing speed of signals is significantly increased and at the same time there is compliance with important configuration stipulations, for example of EN 12094-1.

Figure 13:
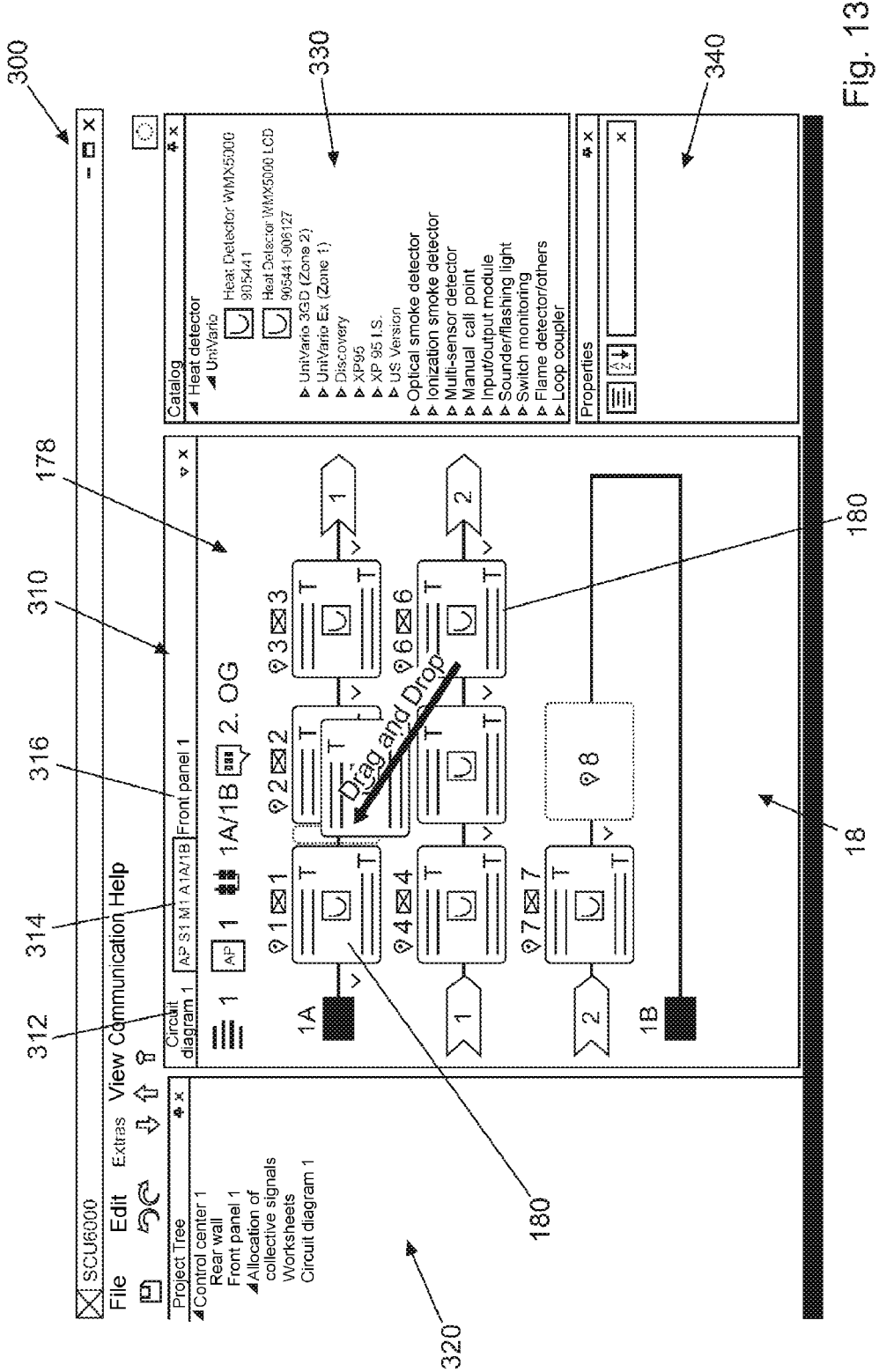
FIG. 13 shows schematically and by way of example an extract from the operator interface.

FIG. 13 shows schematically and by way of example a further representation 18 of the hardware configuration component, wherein the representation 18 illustrates a configuration of subscribers 180 of a module 178. The module 178 is a loop module in this example.

The subscribers 180 are for example heat detectors, smoke detectors, manual call points, etc., which can be put at positions of the loop line by way of a catalog 330. The subscribers 180 can be displaced as desired on the loop line.

The illustration in FIG. 13 is shown by way of example for a module 178; there are likewise representations 18 for all further modules, for example the limit value module 172.

Returning to the description of FIG. 1, the function of the standard conformity component 30, of the communication component 40, of the simulation component 60 and of the documentation component 70 will now be described.

The standard conformity component 30 is embodied to check a complete or partial conformity of the configuration of the control center 100 with a designed standard. In particular, the selection of the standard is defined as a first step when creating a configuration project of a control center 100. The different standards differ for example in the requirements in respect of alerting, signals, etc.

A partial conformity may make it possible, for example, for deviations from the standard as are dependent on the individual case to be allowed. Details in this respect should be checked in the individual case for corresponding projects of control centers 100.

The communication component 40 is embodied to transmit the configuration to the control center 100. For this purpose, a version comparison is preferably carried out in order to prevent the configuration from being transmitted to the control center 100 if the version of the computer program product 1 is newer than the version of the control center 100. This could have the consequence of specific functions of the configuration not being transmitted completely and/or correctly to the control center 100.

The communication component 40 is preferably embodied to load and import the configuration of a control center 100. In particular, as a result, a configuration installed on a control center 100 can be evaluated, checked, adapted and optionally updated by means of the logic configuration component 20 and the hardware configuration component 10. The communication component 40 thus enables a bidirectional communication between the computer program product 1 and the control center 100.

The communication component 40 is furthermore embodied to communicate with the cloud 200, for example in order to ascertain whether or not the software version of the computer program product 1 is up to date. If appropriate, the communication component 40 will instigate an update of the computer program product 1.

The simulation component 60 is embodied to simulate the configuration offline and/or online. That means that the simulation component 60 is embodied to simulate the configuration both on the control center 100 and on the PC if the computer program product 1 is executed thereon.

In this regard, for example, it is possible to register inputs into the operator control panel area of the front panel of the control center 100 and to evaluate the reaction thereto by means of the simulation component 60. Alternatively, the same process can be initiated on a representation of the front panel by means of user inputs. Combinations of both simulation alternatives are conceivable.

Finally, the documentation component 70 is embodied to document the configuration of the control center. This may be of relevance for various purposes. The configuration of the control center can be stored in a storage unit, such as a hard disk, for example, on the computer on which the computer program product 1 is executed. Alternatively and preferably, the configuration is transmitted to the cloud 200 by means of the communication component 40. Particularly preferably, a unique time stamp is used for this purpose, for example using blockchain technology. This can ensure that the corresponding configuration was created at a specific point in time and has not been altered since this point in time.

LIST OF UTILIZED REFERENCE SIGNS

1 Computer program product
10 Hardware configuration component
12, 14, 18 Representation of the hardware configuration component
13 Position for module
20 Logic configuration component
22 Representation of the logic configuration component
30 Standard conformity component
40 Communication component
50 Logic checking component
60 Simulation component
70 Documentation component
100 Control center
141 Labelling fields
143 Central operator control display
145 Expansion locations
160, 162, 164 Rails
172 Limit value module
174 Relay module
176 Control module
180 Subscriber
200 Cloud
221, 223-229 Subscriber
222 Connection line
300 Operator interface
310 Work area
312, 314, 316 Tab
320 Operator control area
330 Catalog
340 Property area
350 Output area of the logic checking component
351 Header row
352 Search field
354 Column "view"
356 Column "device"
358 Column "1-eye symbol"
359 Column "2-eye symbol"
502 Group number
504 Limit value module
506 Relay module
508 Position indication
602 Operator control panel area key
604 Limit value line
606, 608 LED
1100 Context menu
1110 Button
1130 Context menu
1140 Button
1150 Button
1200 Functional component

The invention claimed is:

1. A computer program product for configuration of a control center, comprising:
a hardware configuration component for configuration of hardware components including modules and/or front panel components of the control center,
a logic configuration component for configuration of a functional logic of the control center,
wherein the logic configuration component is designed to provide functional components,
wherein the functional components are decoupled from the hardware components of the control center and embodied in such a way that reversible assignment of functional component to hardware component is made possible,
wherein the logic configuration component is designed to add and remove functional components, to connect functional components to one another and to disconnect them from one another, and to allocate properties to functional components, and
wherein the logic configuration component is designed to provide predefined combinations of functional components as locked combination components, wherein a combination component implements the logic of a complete extinguishing region.

2. A computer program product for configuration of a control center, comprising:
a hardware configuration component for configuration of hardware components including modules and/or front panel components of the control center,
a logic configuration component for configuration of a functional logic of the control center,
wherein the logic configuration component is designed to provide functional components,
wherein the functional components are decoupled from the hardware components of the control center and embodied in such a way that reversible assignment of functional components to hardware components is made possible, and
wherein the hardware configuration component is embodied to provide two representations of hardware arrangements, wherein a first representation is embodied for configuration of hardware components at a rear side of the control center and a second representation is embodied for configuration of front panel components at a front side of the control center.

3. The computer program product as claimed in claim 2, wherein the logic configuration component is designed
to add and remove functional components,
to connect functional components to one another and to disconnect them from one another, and
to allocate properties to functional components.

4. The computer program product as claimed in claim 2, wherein the logic configuration component is embodied to provide a representation of the functional logic, designated as logic circuit diagram, using the functional components and connections between the functional components.

5. The computer program product as claimed in claim 2, wherein the hardware configuration component is embodied to enable the configuration of at least one, a plurality or all, of the following hardware components:
limit value module,
relay module,
control module,
loop module,
voltage output-EFD module,
fire department peripheral equipment module.

6. The computer program product as claimed in claim 2, wherein the hardware configuration component is embodied for implementing at least one, a plurality or all, of the following functionalities:
assigning a subscriber to a hardware group,
configuring the front panel components with collective signals,
integrating a layout of the control center.

7. The computer program product as claimed in claim 2, wherein the computer program product is embodied to provide a graphical user interface, wherein the graphical user interface presents representations of the hardware configuration component and of the logic configuration component simultaneously.

8. The computer program product as claimed in claim 7, wherein the computer program product is designed to make all changes reversibly by the hardware configuration component and/or the logic configuration component.

9. The computer program product as claimed in claim 7, which furthermore has a logic checking component, wherein the logic checking component is designed to check at least one, a plurality or all, of the following parameters and functionalities:
compliance with value ranges,
double allocation of group numbers,
nonsensical or incorrect interconnection of the functional components, the hardware components and/or the front panel components,
free inputs and outputs at the functional components,
hardware configuration problems.

10. The computer program product as claimed in claim 9, wherein the computer program product is embodied to present an output of a logic checking component simultaneously with a representation of the hardware configuration component and/or of the logic configuration component in the graphical user interface.

11. The computer program product as claimed in claim 2, wherein the computer program product furthermore has a standard conformity component, wherein the standard conformity component is embodied to check complete or partial conformity of the configuration of the control center with a desired one of a plurality of standards provided.

12. The computer program product as claimed in claim 2, which furthermore comprises a simulation component for simulating the configuration of the hardware components and/or the front panel components, wherein the simulation component is embodied for online simulation of the configuration with inclusion of the control center and for offline simulation of the configuration without inclusion of the control center.

13. The computer program product as claimed in claim 2, which furthermore comprises a documentation component for documenting the configuration of the control center.

14. A method for configuration of a control center using a computer program product as claimed in claim 2.

15. A control center, comprising a communication module, wherein the communication module is embodied to receive data for configuration of the control center from a computer program product as claimed in claim 2 and to transmit data for configuration and real-time data for online simulation, to the computer program product.

16. A computer program product for configuration of a control center, comprising:
a hardware configuration component for configuration of hardware components including modules and/or front panel components of the control center,
a logic configuration component for configuration of a functional logic of the control center,
wherein the logic configuration component is designed to provide functional components,
wherein the functional components are decoupled from the hardware components of the control center and embodied in such a way that reversible assignment of functional components to hardware components is made possible, and
wherein the computer program product furthermore has a communication component for bidirectional communication with the control center, wherein the communication component is embodied for transmitting a configuration to the control center and for transmitting the configuration from the control center, wherein the communication component is embodied to carry out a version comparison with the control center, and to transmit the configuration to the control center only if the version of the computer program product corresponds at least to the version of the control center.

* * * * *